Nov. 24, 1964     G. L. BOYER     3,158,831

UNDERWATER ACOUSTIC INTENSITY METER

Filed May 31, 1961     3 Sheets-Sheet 1

INVENTOR
GEORGE L. BOYER

BY

*H. L. Gordon*
AGENT

United States Patent Office 3,158,831
Patented Nov. 24, 1964

3,158,831
UNDERWATER ACOUSTIC INTENSITY METER
George L. Boyer, Endicott, N.Y., assignor to the United States of America as represented by the Secretary of the Navy
Filed May 31, 1961, Ser. No. 113,966
10 Claims. (Cl. 340—5)
(Granted under Title 35, U.S. Code (1952), sec. 266)

The invention described herein may be manufactured and used by or for the Government of the United States of America for governmental purposes without the payment of any royalties thereon or therefor.

This invention relates to an underwater acoustic intensity meter for measuring sound intensity over a wide frequency and dynamic range and more particularly in close proximity to a sound source.

Old methods of sound intensity measurements which measured the pressure gradient between two widely separated points only measure the average pressure gradient over the area between the two points so that the measurements are of little use in a curved sound field or a complex wave field and have poor sensitivity and small dynamic range.

Sound intensity is defined as the average rate of sound energy transmitted in a specified direction through a unit area normal to this direction at the point considered, or $$Ia = \frac{1}{T}\int_0^T p v_a dt \qquad (1)$$

where:
$Ia$ = sound intensity
$T$ = an integral number of periods of a sound wave or a time long compared to a period of the wave.
$p$ = the instantaneous sound pressure.
$v_a$ = the component of the instantaneous particle velocity in the direction $a$.

While it might seem to be relatively easy to measure the pressure and particle velocity and calculate the sound intensity, previous methods of measuring the particle velocity have used a mass seismically mounted by a spring which had a very low frequency response. In addition, at and above the resonant frequency of the velocity meter, a large increase in output occurred and a large phase shift took place in the output to render the velocity measurement unusable.

This invention uses a stiffness controlled accelerometer having a large mass mounted on a piezoelectric transducer that is excited in a thickness mode to provide a wide frequency range of operation and a high sensitivity to measure the particle acceleration. An electronic integrating circuit is used to derive the particle velocity from the acceleration.

Equation 1 is readily usable for a plane wave, but, in a spherical field or near a multi-source field, the pressure and particle velocity are not in phase. As shown in "Acoustical Engineering" by H. F. Olson, D. Van Nostrand Co., 1948, pp. 12, Fig. 1.2, the phase angle between the particle velocity and pressure may vary from 0° to 90° while approaching a spherical or point source while the absolute magnitude of the particle velocity to that of the pressure may vary from 1 to 100.

Therefore, in the near field of a spherical or point source, the well known plane wave Formula 1 cannot be used. The difference in phase between pressure and particle velocity is determined in the following manner.

Beginning with the relationship $$I = \frac{p^2}{Pc} \qquad (2)$$

$I$ = the sound intensity
$p$ = the effective sound pressure
$P$ = the density of the medium
$c$ = the velocity of propagation Returning to Equation 1, $$I \alpha p v \qquad (3)$$

If $p$ and $v$ differ by a phase angle $\theta$, as in the case of a near field measurement, and $$p = A \sin \omega t \qquad (4)$$

and $$v = B \sin (\omega t + \theta) \qquad (5)$$

then $$I \alpha AB[\sin \omega t \cdot \sin (\omega t + \theta)] \qquad (6)$$

and, by use of the trigonometric identities, Equation 6 reduces to (7)

$$I = AB(-\cos \theta) \qquad (7)$$

Thus the intensity measurement based on the pressure and particle velocity must include a measurement of the phase angle $\theta$ if the true intensity is to be measured so that the intensity at a point other than that at the point of measurement may be calculated.

This invention therefore includes a phase angle meter whereby the phase angle between the pressure and particle velocity may be measured.

If randomly varying signals or noise are present, another device called a polarity coincidence correlator is used which measures the difference between the time when the pressure and velocity have the same polarity such as positive or negative and the time that they have the opposite polarity.

As described in "Correlators for Signal Reception" Harvard University Acoustics Research Laboratory Technical Memorandum No. 27, September 18, 1952, by Faran, Jr. and Hills, Jr., a polarity coincidence correlator with two Gaussian noise signals $v_1(t)$ and $v_2(t)$ has an output $$R(0) = \frac{2}{\pi} \sin^{-1} P_{12}(0) \qquad (8)$$

where $$P_{12}(0) = \frac{\overline{v_1(t) v_2(t)}}{[\overline{v_1(t)^2} \overline{v_2(t)^2}]^{\frac{1}{2}}} \qquad (9)$$

$P_{12}(0)$ is the normalized cross-correlation coefficient where the time delay between the signals is zero. If the two inputs are sinusoids, then $P_{12}(0)$ reduces to $\cos \theta$, where $\theta$ is the phase angle between the signals as in Equation 7.

Therefore, the polarity coincidence correlator will measure the cross-correlation coefficient which, with a measurement of the magnitude of the pressure and particle velocity will provide a correct measurement of the sound intensity for noise or a complex wave.

An object of this invention is therefore to measure the sound intensity in a field near to a sound source or in a spherical field.

Another object of this invention is to measure sound intensity over a wide frequency range without undesired oscillations or standing waves.

Another object of this invention is to measure acoustic intensity over a wide dynamic range so that very high and very low acoustic intensities may be measured.

Another object of this invention is to measure sound intensity at a single point or within a very small volume without having to measure an average value over a large volume or area.

Another object of this invention is to measure particle acceleration over a wide frequency and dynamic range by using a stiffness controlled accelerometer.

Another object of this invention is to measure the phase angle and cross-correlation coefficient for simple or complex sound fields.

Other objects and many of the attendant advantages of this invention will be readily appreciated as the same becomes better understood by reference to the following detailed description when considered in connection with the accompanying drawings wherein.

Figure 1:
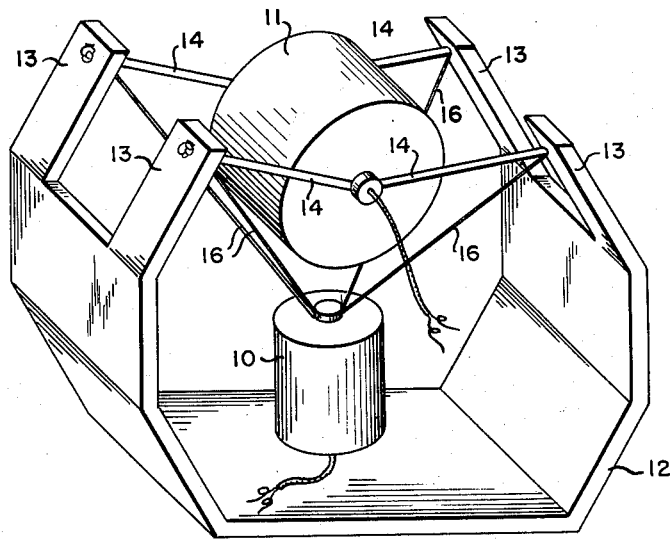
FIG. 1 is a pictorial view in perspective of the pressure pickup and accelerometer mounted on the mechanical support.

Referring now to the drawings, FIG. 1 is a pictorial view of the pressure pickup or hydrophone 10 and accelerometer 11 mounted on the mechanical support or frame 12. The mechanical support 12 is made of a plastic, such as a polyester resin laminated glass cloth which is molded in the form of an essentially hollow or open shell-like frame having extensions protruding inwardly into the open portion thereof for support of the elements 10 and 11. These inward extensions are indicated as four arms 13. The accelerometer 11 is attached by rubber bands 14 to arms 13 so that it may oscillate and move freely in response to the sound vibrations in the water.

The pressure pickup 10 is attached by cords 16 to the arms 13 in close proximity to accelerometer 11 so that the distance between the pressure measurement and acceleration measurement will be as small as possible.

Figure 2:
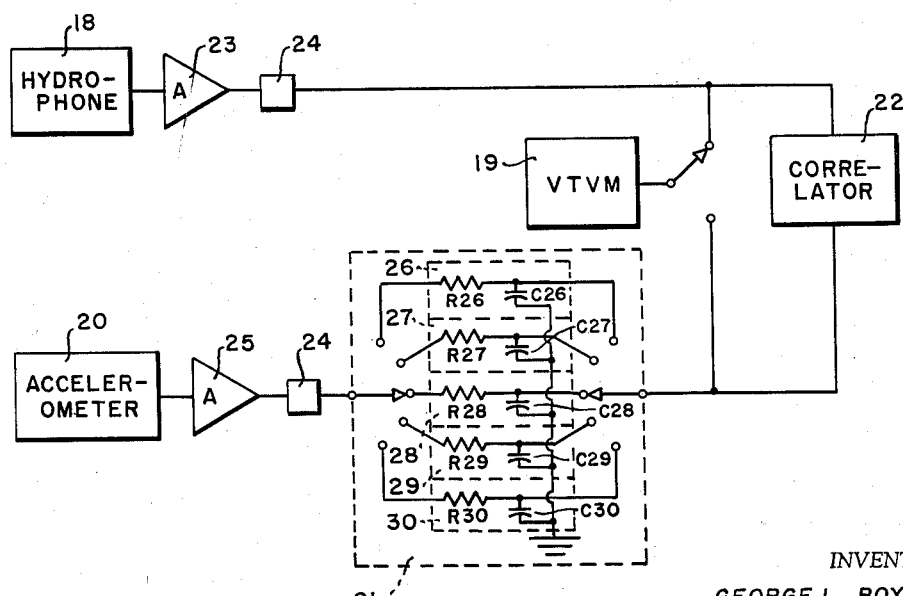
FIG. 2 is a diagram of the underwater acoustic intensity measuring system.

A sound intensity measurement is made as indicated by the diagram of FIG. 2 where the output of a hydrophone 18 of the same design as that of hydrophone 10 is amplified in amplifier 23 and measured in volts or decibels by the vacuum tube voltmeter 19. An accelerometer 20 of the same design as accelerometer 11 produces an output amplified in amplifier 25 and electrically integrated in integrator 21 to provide an output to meter 19 which is proportional to the sound particle velocity. The product of the pressure and particle velocity when multiplied by the cosine of the phase angle or the cross correlation coefficient as measured by correlator 22 provides the intensity measurement. In order to integrate the pressure and particle velocity over a time that is long compared to the period of the lowest frequency sound wave whose intensity is to be measured as indicated by Equation 1, meter 19 has a 10 second time constant.

Band pass filters 24 are included in each channel for use in analyzing the sound intensity over a frequency range of interest and for simplifying the electrical integration.

A major advantage of this measurement system is the wide frequency response from the stiffness controlled accelerometer which allows a true intensity measurement for curved and complex sound fields without introducing instrument oscillations and extraneous noise.

A conventional hydrophone such as type H-2000 by the David Taylor Model Basin, Carderock, Maryland, may be used for hydrophone 18.

As an example of the type of vacuum tube voltmeter 19, a model F D.C. voltmeter by Trio Laboratories, Plainview, Long Island, New York was used.

The amplifiers 23 and 25 used were Preamplifier Type 1000 and amplifier Type 2000 made by the David Taylor Model Basin, Carderock, Maryland.

The Polarity Coincidence Correlator 22 was a modified Type 405 Phase Meter by Advance Electronics Co., Inc., Passaic, N.J. as described in Electronic Equipment, November 1954, pages 14–15. The only modification involved was the use of an additional coincident slicer similar to the one used in the Type 405 design so that the time when the pressure and velocity signals are both positive and both negative at the same time will be measured as compared to the time when they are of opposite polarity.

The filters used were one octave (3 db down) band pass filter Type 8P2B made by White Laboratories, Austin, Texas, with center frequencies of 70.7 c.p.s., 141 c.p.s., 283 c.p.s., 565 c.p.s., and 1130 c.p.s.

An example of the integrating circuits is shown in FIG. 2 where a series of R-C integrators are used where each integrator 26–30 is for the corresponding filter as shown in the following table:

70.7 c.p.s.:
R26 _____ohms__ 310K
C26 _____μf__ 1
141 c.p.s.:
R27 _____ohms__ 310K
C27 _____μf__ .5
283 c.p.s.:
R28 _____ohms__ 820K
C28 _____μf__ .1
565 c.p.s.:
R29 _____ohms__ 390K
C29 _____μf__ .1
1130 c.p.s.:
R30 _____ohms__ 220K
C30 _____μf__ .1

If a body having a density close to that of a fluid is immersed in the fluid and is "softly" mounted or relatively free to move over a limited area, the body will respond to the velocity and acceleration of the sound waves if its size is small compared to the wavelength of the highest frequency sound to be measured.

Figure 3:
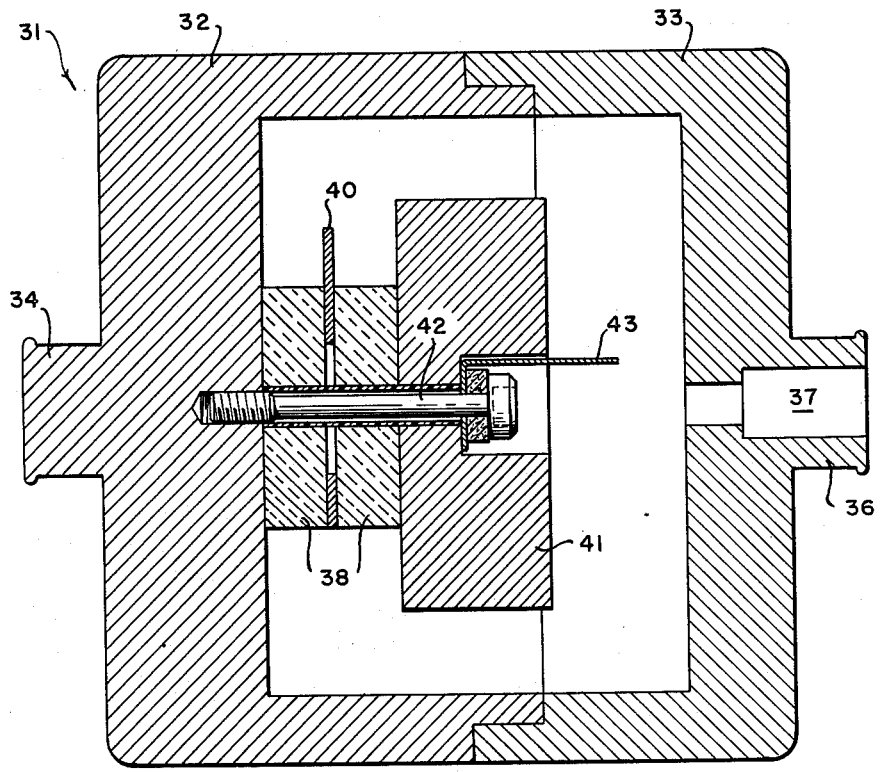
FIG. 3 is a cross sectional view to scale of a stiffness controlled accelerometer used in the measuring system.

An embodiment of an accelerometer 31 used in the underwater sound intensity measuring system is shown to scale in FIG. 3. A base housing 32 and upper housing 33 which fit together are made of magnesium to provide a low density accelerometer with a high resonant frequency. A base housing post 34 and upper housing post 36 provide a means for attaching the rubber bands 14 to the accelerometer 31. Upper housing post 36 has a hole 37 for the electrical leads from the accelerometer element to be taken out.

The means for detecting the particle acceleration are two piezoelectric ceramic discs 38 made of lead zirconate which are ¼ inch thick and 1 inch in diameter. A contact 40 separates the discs 38 and a brass 200 gram weight 41 applies pressure to the piezoelectric discs 38 in response to an acceleration of the housing or accelerometer. An insulated screw 42 clamps the discs 38, mass 41, and second electrical contact 43.

The accelerometer 31 has a density of between 1 and 2 and therefore, with the relatively free suspension of the rubber bands 14, will readily follow high frequency sound waves in water. The lead zirconate discs 38 with the electrical contacts have a large capacitance, high sensitivity and wide frequency range of operation.

Figure 4:
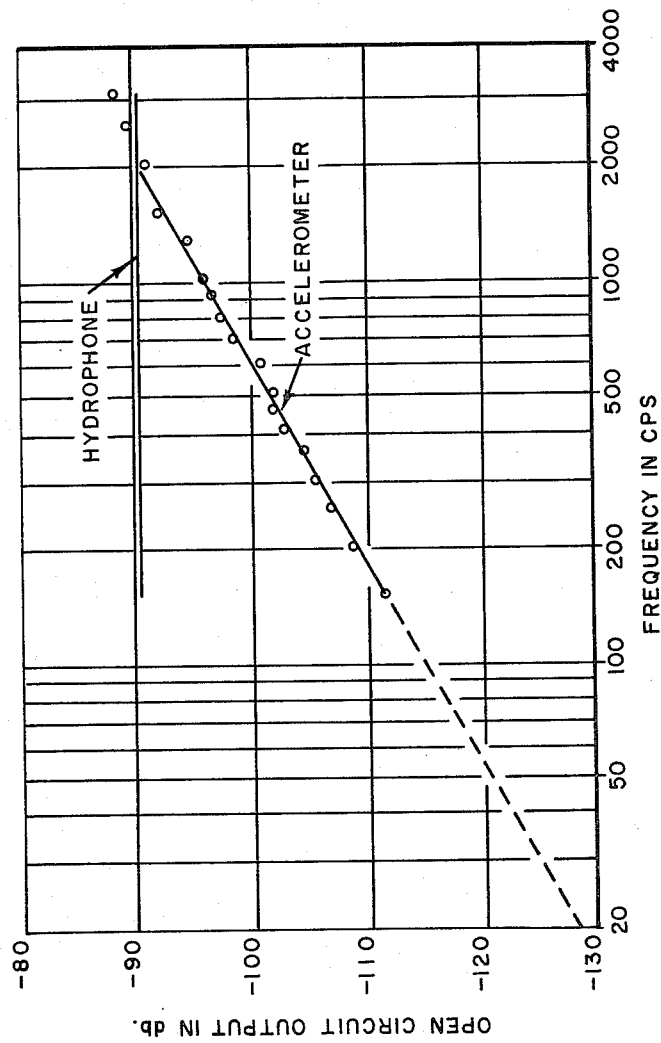
FIG. 4 is a graph of the relative response of the accelerometer disclosed in FIG. 3 and the hydrophone where the decibel output is plotted against frequency.

A calibration curve for the accelerometer and conventional hydrophone is shown in FIG. 4 where the open circuit output in decibels relative to 1 volt per μbar for a plane wave sound field in water is plotted as the ordinate with the abscissa in cycles per second. The measurements were taken up to 5000 c.p.s. where the test projector output created a clearly distorted wave.

The relative response between the accelerometer and hydrophone outputs was generally within ±4° in the 20–2000 c.p.s. range although at some frequencies phase shifts of 5–7 degrees were noted. It is believed that these phase shifts are due to reflections due to the mechanical support, rubber bands, and cords rather than inherent deficiencies in the accelerometer or hydrophone.

The underwater acoustic intensity meter thus provides an accurate, sensitive, and wide band means for measuring acoustic intensity which is particularly useful for curved or multi-source sound fields since the measurement is made within a very small area, that is, the distance between the hydrophone and accelerometer.

The stiffness controlled accelerometer provides a large signal output with a very high resonant frequency so that undesired oscillations or troublesome phase shifts are not generated in the sound pickups.

Obviously many modifications and variations of the present invention are possible in the light of the above teachings. It is therefore to be understood that within the scope of the appended claims the invention may be practiced otherwise than as specifically described.

What is claimed is:

1. An underwater acoustic intensity meter comprising a stiffness controlled accelerometer having an output integrating means connected to said accelerometer, a pressure sensitive hydrophone mounted near said accelerometer, and measuring means connected to said integrating means and to said hydrophone for measuring the sound intensity over a wide frequency range.

2. An underwater acoustic intensity meter according to claim 1 and further characterized by said integrating means additionally comprising a resistor and capacitor.

3. An underwater acoustic intensity meter according to claim 1 and further characterized by correlation means forming part of said measuring means for measuring the cross-correlation coefficient for said sound intensity whereby complex sound signals may be measured.

4. An underwater acoustic intensity meter according to claim 1 and further characterized by said measuring means additionally including octave filters for separating said sound intensity into bands for spectrum analysis.

5. In an underwater acoustic intensity meter system according to claim 1, said accelerometer comprising a housing, a mass mounted inside said housing, and a piezoelectric transducer mounted between said mass and housing for measuring the acceleration of said mass relative to said housing.

6. In an underwater acoustic intensity meter system according to claim 5, wherein the piezoelectric transducer has piezoelectric elements comprising lead zirconate.

7. In an underwater acoustic intensity meter system according to claim 1, a mechanical support for said hydrophone and accelerometer comprising a plastic frame having an upper opening into which extend a plurality of arm members, and means for softly mounting said accelerometer between said arms whereby said accelerometer may move freely in response to sound waves.

8. In an underwater acoustic intensity meter system according to claim 7 wherein said plastic frame comprises polyester resin laminated glass fibers.

9. In an underwater acoustic intensity meter system according to claim 7 wherein said soft mounting means comprise rubber bands connecting said housing to each of said arms.

10. An underwater acoustic intensity meter comprising, a pressure sensitive hydrophone having an output; first amplifier and filter means connected to said hydrophone output for amplifying and separating said output into octave bands; an accelerometer having an output comprising a magnesium housing, a mass mounted inside said housing, and a piezoelectric transducer comprising lead zirconate mounted between said housing and mass for detecting the relative acceleration between them and for generating said accelerometer output; second amplifying and filter means connected to said accelerometer for amplifying and separating said accelerometer output into octave bands; integrator means connected to said second amplifying and filter means for integrating said accelerometer output to provide an output proportional to the sound particle velocity; meter means selectively connectable to said first amplifier and filter means and said integrator means for measuring the sound pressure and particle velocity; correlation means connected to said first amplifying and filter means and said integrator means for measuring the cross-correlation coefficient between said sound pressure and particle velocity; and a mechanical support for softly mounting said accelerometer and hydrophone comprising a plastic frame made of polyester resin laminated glass fibers and having four arms and rubber bands mounted between said arms and accelerometer.

References Cited by the Examiner
UNITED STATES PATENTS

| | | | |
|---|---|---|---|
| 2,531,844 | 11/50 | Fiedler | 181—0.52 |
| 2,597,005 | 5/52 | Kendall | 181—0.52 |
| 2,714,672 | 8/55 | Wright et al. | 310—8.4 |
| 2,726,074 | 12/55 | Ketchledge | 310—8.4 |
| 2,824,243 | 2/58 | Sargeant | 310—8.4 |
| 2,982,942 | 5/61 | White | 340—16 |
| 3,031,528 | 4/62 | Bolston | 181—0.5 |

KATHLEEN H. CLAFFY, *Primary Examiner.*

CHESTER L. JUSTUS, *Examiner.*